(12) United States Patent
Shin et al.

(10) Patent No.: US 12,488,866 B2
(45) Date of Patent: Dec. 2, 2025

(54) METHOD AND APPARATUS FOR INTELLIGENT PHARMACOVIGILANCE PLATFORM

(71) Applicant: SELTA SQUARE CO., LTD., Seoul (KR)

(72) Inventors: Min Kyung Shin, Hwaseong-si (KR); Sol Ji Yang, Seoul (KR); Min Kyung Song, Seoul (KR)

(73) Assignee: SELTA SQUARE CO., LTD., Seoul (KR)

( * ) Notice: Subject to any disclaimer, the term of this patent is extended or adjusted under 35 U.S.C. 154(b) by 477 days.

(21) Appl. No.: 17/929,983

(22) Filed: Sep. 6, 2022

(65) Prior Publication Data

US 2022/0415467 A1    Dec. 29, 2022

Related U.S. Application Data

(63) Continuation of application No. PCT/KR2022/007100, filed on May 18, 2022.

(30) Foreign Application Priority Data

Jun. 23, 2021    (KR) .................. 10-2021-0081339

(51) Int. Cl.
*G16H 20/10*        (2018.01)
*G06F 40/40*        (2020.01)
(Continued)

(52) U.S. Cl.
CPC ............ *G16H 20/10* (2018.01); *G06F 40/40* (2020.01); *G06V 30/10* (2022.01); *G16H 10/60* (2018.01)

(58) Field of Classification Search
CPC ........ G16H 20/10; G16H 10/60; G06F 40/40; G06V 30/10
See application file for complete search history.

(56) References Cited

U.S. PATENT DOCUMENTS 11,556,579 B1 *   1/2023   Bhatia .................. G06F 16/367
11,869,671 B1 *   1/2024   McNair .................. G16H 70/40
(Continued)

FOREIGN PATENT DOCUMENTS

AU        2015213399 A1     3/2016
KR    10-2015-0103667 A     9/2015
(Continued)

*Primary Examiner* — Joshua B Blanchette
(74) *Attorney, Agent, or Firm* — BROADVIEW IP LAW, PC

(57) ABSTRACT

Disclosed herein are a method and apparatus for providing a pharmacovigilance (PV) platform, wherein a method for operating a server may include: receiving input data from a user device; generating at least one command set from the input data by using a first artificial intelligence model that is selected to process the input data; determining whether or not a user that provides the input data has an authority to execute the at least one command set; generating a result of a task, when the user has the authority, by using a second artificial intelligence model that is selected to perform the task according to the at least one command set; generating output data that displays the result of the task by using a visualization module that is selected to visualize the result of the task; and transmitting the output data to the user device.

20 Claims, 6 Drawing Sheets

(51) Int. Cl.
  *G06V 30/10*   (2022.01)
  *G16H 10/60*   (2018.01)

(56) References Cited

U.S. PATENT DOCUMENTS

| | | | |
|---|---|---|---|
| 2014/0067407 A1* | 3/2014 | Sathe | G16H 20/10 |
| | | | 705/2 |
| 2019/0392931 A1 | 12/2019 | Abousy et al. | |
| 2020/0175458 A1* | 6/2020 | Delellis | H04M 3/5175 |
| 2021/0090694 A1 | 3/2021 | Colley et al. | |
| 2021/0240892 A1* | 8/2021 | Meinders | G06F 30/27 |

FOREIGN PATENT DOCUMENTS

| | | | |
|---|---|---|---|
| KR | 10-2017-0130604 A | 11/2017 | |
| KR | 10-1881045 B1 | 7/2018 | |
| KR | 10-2160390 B1 | 9/2020 | |
| KR | 10-2021-0009885 A | 1/2021 | |
| WO | 2014/107428 A1 | 7/2014 | |
| WO | 2016/157467 A1 | 10/2016 | |

* cited by examiner

METHOD AND APPARATUS FOR INTELLIGENT PHARMACOVIGILANCE PLATFORM

CROSS REFERENCE TO RELATED APPLICATION

This application is a continuation of pending PCT International Application No. PCT/KR2022/007100, filed on May 18, 2022, which claims priority to Korean Patent Application No. 10-2021-0081339, filed on Jun. 23, 2021, all of which are hereby incorporated by reference in their entirety.

BACKGROUND

Field

The present disclosure relates to an intelligent pharmacovigilance (PV) platform, and more particularly, to a method and apparatus for providing a platform that performs a PV procedure using an artificial intelligence algorithm.

Description of the Related Art

Pharmacovigilance (PV) means a work of monitoring clinical test results like the benefits and adverse effects of a new drug and safety information after it is released on the market. Pharmacovigilance encompasses not only a work of monitoring adverse events either during a clinical test or on the market but also a work of reporting such events to a related government department.

A pharmaceutical company, which develops and sells pharmaceutical products, should perform a pharmacovigilance procedure at any cost. With the full entry to the International Conference on Harmonisation (ICH), the pharmaceutical industry should follow ICH guidelines in respective areas like manufacturing and clinical practices. In particular, since the year 2012, initiated by Europe, pharmacovigilance regulations have been strengthened, and thus pharmacovigilance emerges as one of the most important works in pharmaceutical companies which are supposed to establish their own pharmacovigilance systems.

A pharmacovigilance procedure requires various works like collecting data generated from various sources, analyzing unstructured data, and applying a regulation. In addition, in a pharmacovigilance procedure, members usually have various authorities, and the content and scope of a given work becomes different according to an authority. Accordingly, a pharmacovigilance procedure has a very complex structure and requires a lot of manpower and expense for operation.

SUMMARY

The present disclosure is directed to provide a method and apparatus for effectively performing a pharmacovigilance (PV) procedure.

The present disclosure is directed to provide a method and apparatus for performing a pharmacovigilance procedure based on an artificial intelligence algorithm.

The present disclosure is directed to provide a method and apparatus for providing a platform that performs a pharmacovigilance procedure by using an artificial intelligence algorithm.

The technical objects of the present disclosure are not limited to the above-mentioned technical objects, and other technical objects that are not mentioned will be clearly understood by those skilled in the art through the following descriptions.

According to an embodiment of the present disclosure, a method for operating a server, which provides a pharmacovigilance (PV) platform, may include: receiving input data from a user device; generating at least one command set from the input data by using a first artificial intelligence model that is selected to process the input data; determining whether or not a user that provides the input data has an authority to execute the at least one command set; generating a result of a task, when the user has the authority, by using a second artificial intelligence model that is selected to perform the task according to the at least one command set; generating output data displaying the result of the task by using a visualization module that is selected to visualize the result of the task; and transmitting the output data to the user device.

According to an embodiment of the present disclosure, among a plurality of artificial intelligence models stored in an artificial intelligence model repository, the first artificial intelligence model and the second artificial intelligence model may be selected based on the user and the task.

According to an embodiment of the present disclosure, among a plurality of visualization modules stored in a visualization module repository, the visualization module may be selected based on the user and the task.

According to an embodiment of the present disclosure, the input data may have at least one form of an image document, an email, and a user input, and the first artificial intelligence model may perform at least one of optical character recognition (OCR) and natural language processing (NLP) for the input data.

According to an embodiment of the present disclosure, the artificial intelligence model repository may include a plurality of artificial intelligence models and have a structure capable of adding or deleting to or from an artificial intelligence model repository according to a command of a platform manager.

According to an embodiment of the present disclosure, the task may be one of a plurality of tasks that are performed successively, and the plurality of tasks may include case entry (CE), quality control (QC), medical review (MR) and case lock (CL), and the result of the task may be delivered to a subsequent user of the user.

According to an embodiment of the present disclosure, the method may further include receiving a review result of the user concerning the result of the task and analyzing and storing the review result by using a third artificial intelligence model.

According to an embodiment of the present disclosure, the method may further include performing relearning for the second artificial intelligence model by using the review result.

According to an embodiment of the present disclosure, the generating of the result of the task may further include converting clinical information, which includes an adverse event, a patient history and an underlying disease that are included in the input data, and item information into structured data through artificial intelligence model learning.

According to an embodiment of the present disclosure, the output data may include the input data, the result of the task and information associated with matching between an item included in the input data and an item included in the result of the task, and the input data and the result of the task may be displayed on the user device, together with a first indicator indicating a matching relation between identical items and a second indicator indicating an item that is included in the input data but is not input into the result of the task.

According to an embodiment of the present disclosure, the method may further include applying exception handling to a series of procedures associated with the task, according to a degree of an adverse effect in which an adverse event included in the input data appears.

According to an embodiment of the present disclosure, the exception handling may include allocating an additional task.

According to an embodiment of the present disclosure, a system for providing a pharmacovigilance (PV) platform may include: a receiver configured to receive input data from a user device; an input processing unit configured to generate at least one command set from the input data by using a first artificial intelligence model that is selected to process the input data; an authority check module configured to determine whether or not a user providing the input data has an authority to execute the at least one command set; an artificial intelligence analysis module configured to generate a result of a task, when the user has the authority, by using a second artificial intelligence model that is selected to perform the task according to the at least one command set; a visualization module configured to generate output data that displays the result of the task by using the visualization module that is selected to visualize the result of the task; and a transmitter configured to transmit the output data to the user device.

According to an embodiment of the present disclosure, the receiver may be further configured to receive a review result of the user concerning the result of the task, and the artificial intelligence analysis module may be further configured to analyze and store the review result by using a third artificial intelligence model.

According to an embodiment of the present disclosure, the system may further include a learning module configured to perform relearning for the second artificial intelligence model by using the review result.

According to an embodiment of the present disclosure, the artificial intelligence analysis module may be further configured to apply exception handling to a series of procedures associated with the task, according to a degree of an adverse effect in which an adverse event included in the input data appears.

The features briefly summarized above with respect to the present disclosure are merely exemplary aspects of the detailed description below of the present disclosure, and do not limit the scope of the present disclosure.

According to the present disclosure, a pharmacovigilance (PV) task may be processed and evaluated more consistently and accurately from etiological and other medical perspectives, and safety information and risks may be quickly detected and handled.

Effects obtained in the present disclosure are not limited to the above-mentioned effects, and other effects not mentioned above may be clearly understood by those skilled in the art from the following description.

The features briefly summarized above with respect to the present disclosure are merely exemplary aspects of the detailed description below of the present disclosure, and do not limit the scope of the present disclosure.

DETAILED DESCRIPTION

Figure 1:
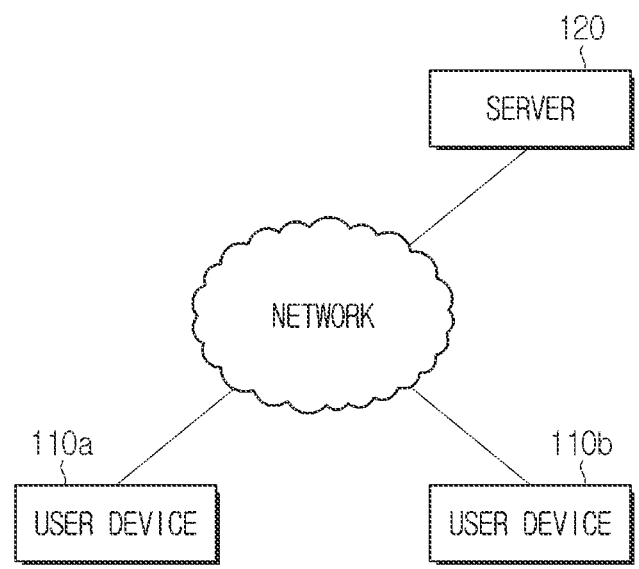
FIG. 1 illustrates a structure of a system for providing a pharmacovigilance platform according to an embodiment of the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

The present disclosure proposes a technique for performing a pharmacovigilance (PV) procedure using an artificial intelligence platform. In particular, the present disclosure is directed to provide a platform capable of supporting PV procedure in a cloud environment, a local environment and other various embodiments.

While data volumes for reporting adverse effects of drugs become enormous at an alarming rate, they are all manually analyzed, evaluated and processed. Thus, the present disclosure proposes a technique for improving accuracy by applying optical character recognition (OCR) and natural language processing (NLP) technologies to an adverse effect report, for detecting clinical information like the name of an adverse event, a patient history and an underlaying disease and item information according to an unified international regulation in collected adverse effect big data, and for converting adverse effect big data into structured data and storing the data.

FIG. 1 illustrates a structure of a system for providing a pharmacovigilance platform according to an embodiment of the present disclosure.

Referring to FIG. 1, a system includes a user device 110a, a user device 110b, and a server 120 that are connected to a communication network. FIG. 1 exemplifies the two user devices 110a and 110b, but there may be three or more user devices.

The user device 110a and the user device 110b are used by a user who is willing to participate in a pharmacovigilance procedure using a platform according to an embodiment of the present disclosure. The user device 110a and the user device 110b may obtain input data (e.g., an email, a document image, a user's input), transmit the input data to the server 120, and interact with the server 120. Each of the user devices 110*a* and 110*b* may include a communication unit for communication, a storage unit for storing data and a program, a display unit for displaying information, an input unit for a user's input, and a processor for control. For example, each of the user devices 110*a* and 110*b* may be an application for platform access, a universal device (e.g., a smart phone, a tablet PC, a laptop, a desktop computer) with a program installed in it, or a platform-specific access terminal.

The server 120 provides a platform according to embodiments of the present disclosure. The server 120 provides various functions for a pharmacovigilance platform and may operate an artificial intelligence model. An example of an artificial neural network applicable to the present disclosure will be described below with reference to FIG. 2. In addition, the server 120 may perform learning for an artificial intelligence model by using learning data. According to various embodiments of the present disclosure, the server 120 stores a plurality of artificial intelligence models for various analysis tasks included in a pharmacovigilance procedure and selectively uses at least one of the artificial intelligence models as necessary. In addition, the server 120 stores a plurality of visualization tools for expressing an analysis result to a user and selectively uses at least one of the visualization tools as necessary. In addition, the server 120 stores profile information including an authority for a plurality of users and processes input data based on an authority for a requested task. Herein, the server 120 may be a local server in a local network or a remote access server (e.g., a cloud server) connected via an external network. The server 120 may include a storage unit for storing data and a program and a processor for control.

Figure 2:
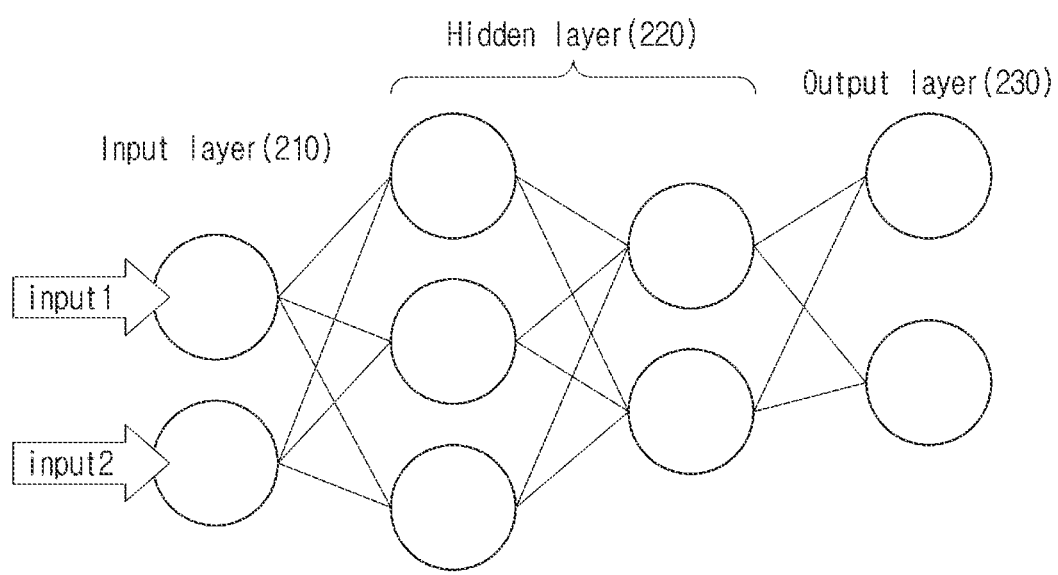
FIG. 2 illustrates a structure of an artificial neural network applicable to a system according to an embodiment of the present disclosure.

FIG. 2 illustrates a structure of an artificial neural network applicable to a system according to an embodiment of the present disclosure. An artificial neural network as shown in FIG. 2 may be understood as a structure of artificial intelligence models stored in the server 120. Referring to FIG. 2, an artificial neural network is composed of an input layer 210, at least one hidden layer 220, and an output layer 230. Each of the layers 210, 220 and 230 consists of a plurality of nodes, and each node is connected to an output of at least one node that belongs to a previous layer. Each node calculates an inner product of each output value of nodes of a previous layer and a corresponding connection weight and then delivers an output value, which is the inner product times a non-linear activation function, to at least one neuron of a next layer.

An artificial neural network like in FIG. 2 may be formed by learning (e.g., machine learning, deep learning). In addition, an artificial neural network model used in various embodiments of the present disclosure may include at least one of a fully convolutional neural network, a convolutional neural network, a recurrent neural network, a restricted Boltzmann machine (RBM), and a deep belief neural network (DBN), but is not limited thereto. Alternatively, it may also include a machine learning method, apart from a deep learning one. Alternatively, it may also include a hybrid model combining deep learning and machine learning. For example, a deep learning-based model may be applied to extract a feature of an image, and a machine learning-based model may be applied when the image is classified or recognized based on the extracted feature. A machine learning-based model may include a support vector machine (SVM) and AdaBoost but is not limited thereto.

Figure 3:
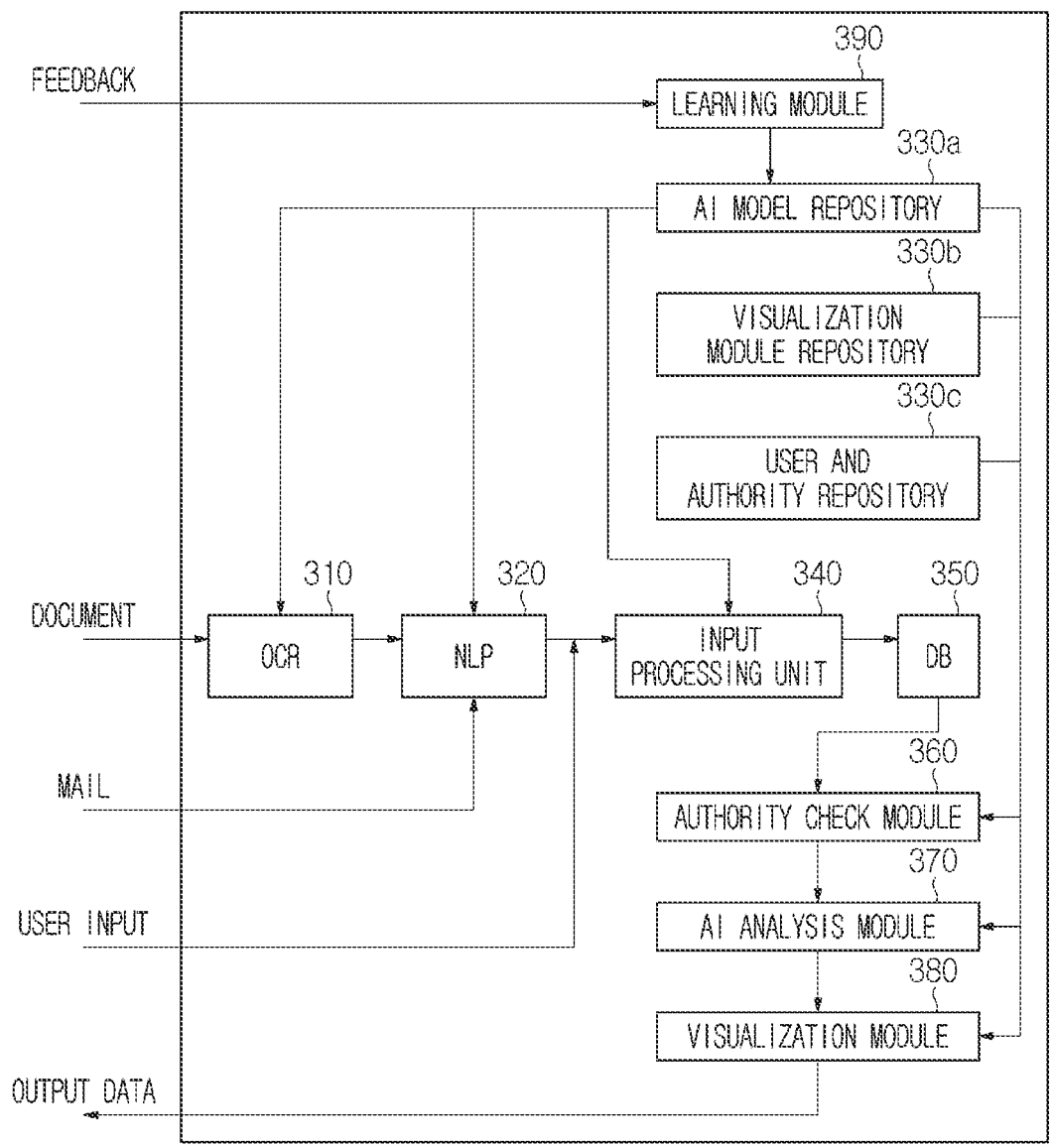
FIG. 3 illustrates a functional configuration of a server according to an embodiment of the present disclosure.

FIG. 3 illustrates a functional configuration of a server according to an embodiment of the present disclosure. FIG. 3 exemplifies a functional configuration of the server 120 of FIG. 1.

Referring to FIG. 3, the server includes an optical character recognition (OCR) module 310, a NLP module 320, an artificial intelligence model repository 330*a*, a visualization module repository 330*b*, a user and authority repository 330*c*, an input processing unit 340, a database (DB) 350, an authority check module 360, an artificial intelligence analysis module 370, a visualization module 380, and a learning module 390.

The OCR module 310 recognizes characters in an image-form document among input data. According to an embodiment of the present disclosure, the OCR module 310 may recognize the characters by using at least one of artificial intelligence models for character recognition stored in the artificial intelligence model repository 330*a*. Data of the characters recognized by the OCR module 310 is provided to the NLP module 320.

The NLP module 320 analyzes and processes a natural language expressed by digitalized character data. Herein, the character data may include at least one of data about the characters recognized by the OCR module 310 and data written with character codes like an email, a web page and an electronic document. The NLP module 320 may perform at least one of morphological analysis, syntactic analysis, semantic analysis and pragmatic analysis for character datasets. According to an embodiment of the present disclosure, the NLP module 320 may process the character data according to a purpose of implementing tasks necessary for a pharmacovigilance procedure. In addition, according to various embodiments of the present disclosure, the NLP module 320 may analyze and process the character data by using one of artificial intelligence models for natural language processing stored in the artificial intelligence model repository 330*a*.

The artificial intelligence model repository 330*a* stores various artificial intelligence models related to functions provided in a pharmacovigilance platform. The artificial intelligence models thus stored may be provided according to a request of another module. The artificial intelligence model repository 330*a* may further store artificial intelligence model management information including an index, corresponding task classification, a module of which the use is permitted, and a user authority level at which use is permitted, for each of artificial intelligence models. Accordingly, the artificial intelligence model repository 330*a* may receive a request for a specific artificial intelligence model from another module, determine whether or not it is possible to provide the requested artificial intelligence model based on the artificial intelligence model management information, and then provide the requested artificial intelligence model when it is determined that it is possible to provide the requested artificial intelligence model.

The visualization module repository 330*b* stores visualization tools for expressing an analysis result that is obtained using an artificial intelligence model. The visualization tools thus stored may be provided according to a request of another module (e.g., the visualization module 380). The visualization module repository 330*b* may further store visualization tool management information including an index, corresponding task classification, a module of which the use is permitted, and a user authority level at which use is permitted, for each of visualization tools. Accordingly, the visualization module repository 330*b* may receive a request for a specific visualization tool from another module, determine whether or not it is possible to provide the requested visualization tool based on the visualization tool management information, and then provide the requested visualization tool when it is determined that it is possible to provide the requested visualization tool.

The user and authority repository 330c stores information on users capable of accessing a system and information on an authority level. The users may have different authority levels according to a given task or ability, and the information on the authority level is stored in the user and authority repository 330c. In addition, the user and authority repository 330c may store log information such as the access records and task records of the users. The user and authority repository 330c may provide stored information according to a request of another module (e.g., the authority check module 360).

The input processing unit 340 generates at least one command set from the input data. The at least one command set includes at least one command and relevant data for proceeding at least one task executable during a pharmacovigilance procedure. For example, at least one command set may include commands for various purposes like data reading, data modification, data confirmation, storage of data and generation of data. The input data provided to the input processing unit 340 may be data through the NPL module 320, data received from a user device, or a combination of data through the NPL module 320 and data received from a user device. For example, based on a result of natural language processing provided from the NLP module 320, the input processing unit 340 may process the input data to perform a task corresponding to a user input provided from a user device. For this, the user may input command-related information by using an interface for a pharmacovigilance platform displayed on the user device. Herein, the information may be input by the user in real time or according to a preset event condition. According to various embodiments of the present disclosure, the input processing unit 340 may process the input data by using one of artificial intelligence models for input processing stored in the artificial intelligence model repository 330a.

The database 350 stores information that is managed on the pharmacovigilance platform. In addition, the database 350 performs an operation corresponding to at least one command set generated by the input processing unit 340. For example, the database 350 may provide information requested by at least one command set or modify information indicated by at least one command set.

The authority check module 360 determines, based on an authority level of the user, whether or not a requested task is possible. The authority check module 360 may request information on the authority level of the user that generates the at least one command set to the user and authority repository 330c and receive the information on the authority level of the user from the user and authority repository 330c. In addition, the authority check module 360 determines, based on the authority level, whether or not the user is permitted to perform a task corresponding to the at least one command set.

The artificial intelligence analysis module 370 performs the task corresponding to at least one command set by using an artificial intelligence algorithm. For this, according to various embodiments of the present disclosure, the artificial intelligence analysis module 370 may request to use one of artificial intelligence models, which are stored in the artificial intelligence model repository 330a, for performing the task. Accordingly, the artificial intelligence analysis module 370 may receive information on an artificial intelligence model (e.g., information on a neural network structure and weights) from the artificial intelligence model repository 330a and perform an inference operation using the artificial intelligence model, or provide input data for inference to the artificial intelligence model repository 330a and receive an inference result.

The visualization module 380 generates output data for expressing a result of the task to the user. For this, according to various embodiments of the present disclosure, the visualization module 380 may request to use one of visualization tools stored in the visualization module repository 330b. The output data is transmitted to a user device requesting the task or another user device related to the task. The output data may be generated based on hardware capacity of a device that receives the output data. Herein, the visualization module 380 determines which visualization tool is to be used to generate the output data and, for this, may use at least one of artificial intelligence models stored in the artificial intelligence model repository 330a.

The learning module 390 performs learning or relearning for artificial intelligence models stored in the artificial intelligence model repository 330a. That is, the learning module 390 performs learning based on learning data. Herein, the learning module 390 may use not only initially acquired learning data but also learning data that is generated based on a user's feedback during the operation of the system. A user's review result concerning an analysis result of an artificial intelligence model may be consent to the analysis result or include non-consent at least to a part of the analysis result. In case non-consent is included, the review result may be fed back as labeled learning data and thus be used for relearning. In this case, since there may be an error in the user's determination, relearning may be performed when review results including at least a predetermined amount of non-consent are accumulated. For this, an artificial intelligence model may be used to determine whether or not a user's review result includes non-consent and to what extent the user gives the non-consent.

In the example of FIG. 3, the artificial intelligence model repository 330a and the visualization module repository 330b are described as parts of a server. That is, the artificial intelligence model repository 330a and the visualization module repository 330b may be implemented as a set of at least one memory that is included in the server. However, according to another embodiment, at least one of the artificial intelligence model repository 330a and the visualization module repository 330b may be implemented as a separate device, not an internal part of the server. In this case, the server may communicate with the artificial intelligence model repository 330a and the visualization module repository 330b via a network and transmit and receive data for an inference operation.

As described with reference to FIG. 3, the artificial intelligence model repository 330a may store various artificial intelligence models. Herein, in the artificial intelligence model repository 330a, addition and deletion of an artificial intelligence model are possible according to a command of a platform manager. Furthermore, according to a predetermined protocol, exchange, sharing, copying and the like of an artificial intelligence model are possible between different systems.

According to an embodiment, an artificial intelligence model may be shared through signaling between systems. For example, when a system #1 requests information on an artificial intelligence model related to a specific function to a system #2, the system #2 may provide a list of relevant artificial intelligence models to the system #1 according to an approval of a manager Herein, the list may include an input/output structure of an artificial intelligence model, learning progress information, information on a use history, a sample of an inference result and the like. Then, the system #1 may provide a list of artificial intelligence models to the manager and request at least one artificial intelligence model according to a command of the manager. Thus, the system #2 may share the requested artificial intelligence model according to the approval of a manager of the system #2.

The above-described sharing procedure for an artificial intelligence model is also applicable to a visualization tool.

Figure 4:
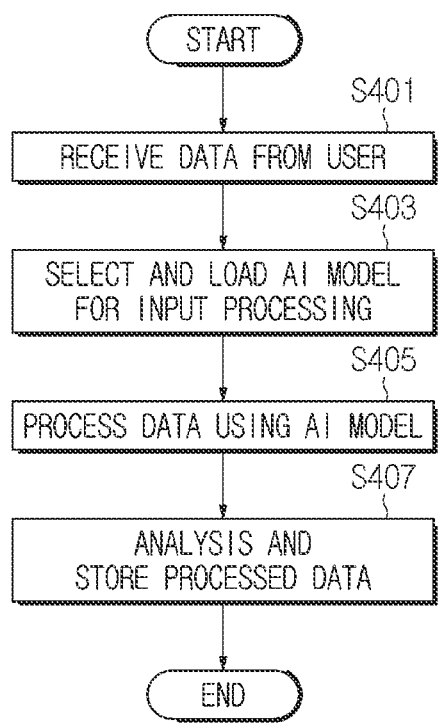
FIG. 4 illustrates an example of a procedure for processing an input of a user in a pharmacovigilance platform according to an embodiment of the present disclosure.

FIG. 4 illustrates an example of a procedure for processing an input of a user in a pharmacovigilance platform according to an embodiment of the present disclosure. FIG. 4 exemplifies a method for operating a server (e.g., server 120).

Referring to FIG. 4, at S401, a server receives data from a user device. The data received from the user device includes at least one of a command instructing to perform a task and data necessary to perform the task. For example, the data may include at least one of a document image, an electronic file including character information, and a user input that is input through an interface for a pharmacovigilance platform. The data may include at least one of a request for a new task, a report on the progress of an ongoing task (e.g., an adverse event), information on data update, and information on user management (e.g., addition of a new user, modification of authorities and so on).

At S403, the server selects and loads an artificial intelligence model for input processing. Herein, the artificial intelligence model is selected to perform at least one of character reading, natural language processing, and command set generation. The selected artificial intelligence model is loaded from a corresponding repository (e.g., the artificial intelligence model repository 330a) into a memory.

At S405, the server processes data by using the artificial intelligence model. That is, the server may read characters in the document image or perform the natural language processing for character information. In addition, the server generates a command set for performing the task based on obtained datasets.

At S407, the server analyzes and stores the processed data. That is, the server performs an operation for the task, as indicated by the command set, for data included in the command set. According to a content of the task, new data may be generated from data included in the command set, data may be modified, or data that is already stored may be retrieved. In addition, according to a content of the task, it may require a user's intervention or may be performed without intervention of the user.

According to a procedure as shown in FIG. 4, the data input from the user may be processed into an available form in a pharmacovigilance platform, and the command set may be generated. Based on the command set, the pharmacovigilance platform may perform various tasks for a pharmacovigilance procedure.

According to an embodiment, when data about the modification of a term used in a relevant regulation or industry, a pharmacovigilance platform may retrieve values corresponding to the modified term in existing data and modify the retrieved values to a new term. As a pharmacovigilance procedure should continue until the selling/permission of a product of a corresponding item is canceled, relevant data needs to be constantly updated. Since one representative example of necessary update is the change in international medical terms, an enormous amount of data may be quickly updated through the above-described process.

According to an embodiment, when information on an adverse event is input, a first artificial intelligence model determines that the adverse event needs to be classified and be analyzed in terms of cause, and a second artificial intelligence model defined for a sequential case analysis may classify the event and analyze its case. An analysis result obtained by the second artificial intelligence model may be delivered to a user that has an authority to review the result, and the user may input a review result into a platform by using various forms (e.g., document, mail, and text). Accordingly, the platform may convert the review result of the user back to data and store and deliver the data to a subsequent user that performs a task at a next phase. In addition, as an artificial intelligence model is used to perform an analysis, an analysis result with uniform quality may be expected. The excellence of quality depends on the amount of learning for the artificial intelligence models, and thus a high-quality analysis result can still be obtained from sufficient learning. In this way, the problem of the lack of professional manpower in the area of pharmacovigilance can be addressed.

Herein, learning may be performed based on learning data that is initially provided, and then the learning may further be performed based on a user's review result. The user's review result concerning an analysis result of an artificial intelligence model may include consent to the analysis result or non-consent at least to a part of the analysis result. In case non-consent is included, the review result is fed back as labeled learning data so that relearning can be performed. In this case, since there may be an error in the user's determination, relearning may be performed when review results including at least a predetermined amount of non-consent are accumulated. For this, an artificial intelligence model may be used to determine whether or not a user's review result includes non-consent and to what extent the user gives the non-consent.

In addition, as a pharmacovigilance procedure proceeds through a platform, numerous types of data, which are to be reflected in a database, may be input more quickly and accurately. For example, as input data is processed through an artificial intelligence model, human resources and time consumed to input data in an existing method may be saved. For example, data with low causality or corresponding to simple report may be input with minimum intervention of users or without intervention of users.

For example, when information included in an email is to be simply input, data may be immediately input without the intervention of the users by setting an event condition related to the email. According to an embodiment, the event condition related to an email may be defined based on a title of the email and an attached file. Specifically, a platform is authorized to access a user's email inbox and may detect a name corresponding to a subject (e.g., a partner company, an organization, etc) and a content-related keyword (e.g., Safety Report) from a title of an email, a sender, text and an attached file and then classify the email according to the subject and the keyword. In addition, the platform may extract information from the title, text and attached file of an email by using an analysis model corresponding to a classified subject and keyword and then store the extracted information.

A pharmacovigilance procedure requires various tasks. Various tasks may have different processing procedures or features. For example, some tasks need to be sequentially processed by a plurality of users. Herein, the plurality of users may have different authority levels, which may be referred to as case entry (CE), quality control (QC), medical review (MR) and case lock (CL). In the order of CE, QC, MR and CL, the authority higher. That is, the CE means the lowest authority level, and the CL means the highest authority level. In addition, the CE, the QC, the MR and the CL may be understood as the phases of PV task. Specifically, the CE is a level at which inputting data about a case is allowed or a phase in which the case is input. The QC is a level at which quality management of a case is allowed or a phase in which quality management is performed. The MR is a level at which a medical review about a case can be presented or a phase in which the medical review is performed. The CL is a level with authority to approve the end of the case or a phase of final approval and end.

According to authority levels, permitted actions may be different. For example, according to a type of report (e.g., clinical test, consumer's voluntary report, etc), seriousness of an adverse effect (e.g., death, threat to life, or serious adverse effect, etc), and a kind of medicine (e.g., new medicine and new product), actions permitted according to users' authority levels may be classified.

Figure 5:
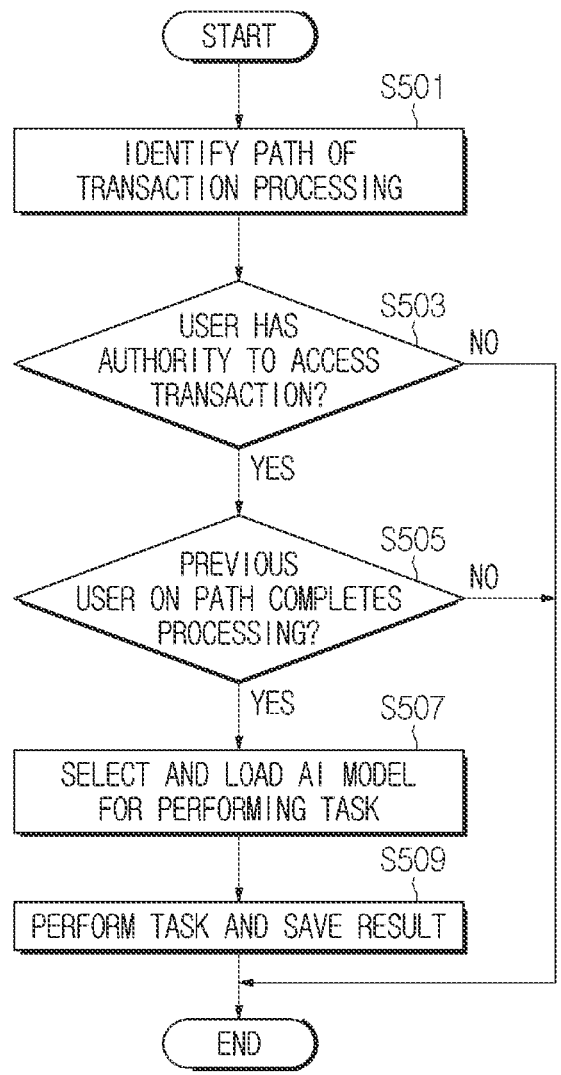
FIG. 5 illustrates an example of a procedure for performing a task based on a user's authority level in a pharmacovigilance platform according to an embodiment of the present disclosure.

According to the above-described authority levels, an embodiment of performing a task requiring sequential processing is described in FIG. 5.

FIG. 5 illustrates an example of a procedure for performing a task based on an authority level of the user in a pharmacovigilance platform according to an embodiment of the present disclosure. FIG. 5 exemplifies a method for operating a server (e.g., server 120). FIG. 5 exemplifies operations for performing a task that is to be sequentially processed by a plurality of users.

Referring to FIG. 5, at step S501, a server identifies a path of transaction processing. Herein, the path is a set of a series of users, and users in the path may have different authorities and are related to one another in an order relation. That is, the server identifies the users related to performing a task requested from a first user and checks an order relation among the users.

At step S503, the server determines whether or not a user has authority to access the transaction. The server checks an authority level required to process a requested task and compares the required authority level and the authority level of the user. Herein, the required authority level may be different according to not only a task but also progress of the task. In case the user has no authority to access the transaction, the server ends this procedure.

On the other hand, in case the user has authority to access the transaction, at step S505, the server determines whether or not processing of a previous user on the path is completed. That is, since the requested task requires sequential processing, when the previous user on the path does not complete processing, a subsequent user cannot perform the task. Accordingly, the server checks whether or not the previous user completes processing and also examines the suitability of the previous user's authority for the processing. In case the processing of the previous user is not completed, the server ends this procedure.

On the other hand, in case the processing of the previous user is completed, at step S507, the server selects and loads an artificial intelligence model for performing the task. Herein, the artificial intelligence model is selected to perform the requested task or to perform an assistant operation of the requested task. As an example of task assistance, the artificial intelligence model may be used to collect and present materials necessary for the user's task. In this case, the artificial intelligence model may be selected based on the authority level of the user and a task step to be performed. The selected artificial intelligence model is loaded from a corresponding repository (e.g., the artificial intelligence model repository 330*a*) into a memory.

At step S509, the server performs the task and stores a result of the task. That is, the server performs an inference operation for input data by using a loaded artificial intelligence model and obtains a result of inference. For example, when an artificial intelligence model collecting and presenting a material necessary for the user's task is used as an artificial intelligence model for task assistance. input data may include the authority level of the user, a task step to be performed, the user's past task history, a subsequent user's level, and past task history of the subsequent user. In addition, output data including the result of inference may include a supplementary material and information that marks a position of information necessary to the user in the supplementary material. The result of inference may be stored in a database (e.g., database 350). In addition, although not shown in FIG. 5, output data to be provided to the user may be generated based on the result of inference, and the output data may be transmitted to a user device. Herein, the output data may be transmitted to the subsequent user, and the output data transmitted to the subsequent user may include a notification that the task of a current user is completed.

In an embodiment described with reference to FIG. 5, when an authority level is insufficient or the processing of the previous user is not completed, the procedure is ended. Herein, according to another embodiment, the server may transmit, to a user device, a notification that processing of a task is suspended. In addition, the notification may include at least one of information explaining a cause of suspension and information on a necessary measure for remove the cause.

According to an embodiment as shown in FIG. 5, a pharmacovigilance platform may support tasks that needs to be sequentially processed by a plurality of users. Herein, a pharmacovigilance platform according to an embodiment of the present disclosure may support exception handling. For example, in a general case, a task is processed on a path from CE (level 1) to QC (level 2) to MR (level 3) to CL (level 4), and, on the other hand, in a case of exception handling, any one level may be excluded from the path or any one level may be added. In addition, in another case of exception handling, a same process is performed at each level, but another user with a corresponding level may replace the path. Exception handling may be defined according to each item or each degree of seriousness of an adverse effect related to a case.

According to an embodiment, as the seriousness of an adverse effect is higher, an additional management procedure may be applied. As a concrete example, in the cases of high seriousness like a serious adverse event (SAE), which is an adverse event corresponding to seriousness, or death and a suspected unexpected serious adverse drug reaction (SUSAR) that are adverse events with serious and unexpected causality, or other adverse effects that are classified as highly serious ones, exception handling may be applied through special monitoring with unexpected or serious indications like new drugs/anticancer drugs.

According to an embodiment, depending on urgency of transaction, some phases may be merged, skipped or simplified. Urgency of transaction may be determined by an artificial intelligence model that determines whether or not transaction is urgent. For example, when a request of transaction is confirmed via an email, a platform selects and calls an artificial intelligence model for determining urgency. In addition, by extracting a keyword in the mail and providing it as input data, the platform infers the urgency of transaction by using the artificial intelligence model. When the degree of urgency exceeds a threshold level, the platform may handle the transaction not in a general procedure but in a simplified procedure through exception handling. Herein, the type and procedure of simplification may be different according to a degree of urgency and a type of transaction. For example, some of a series of phases, including the CE, the QC, the MR and the CL, may be excluded, or all the phases are implemented but a user handling a specific step may be replaced by another user (hereinafter 'alternative user') capable of performing the step more quickly. Herein, in order to replace a user by another user, the platform may set a condition for playing a role as alternative user (e.g., an authority level equal to or above that of the user, a history of performing a homogeneous task) by considering an authority required at a task phase, a past history of task performance, and relevance to the task, search for users satisfying the condition, and then transmit a request message for asking whether or not the users are able to immediately start the task. Next, the platform may set one of users responding to the request message as an alternative user.

Figure 6:
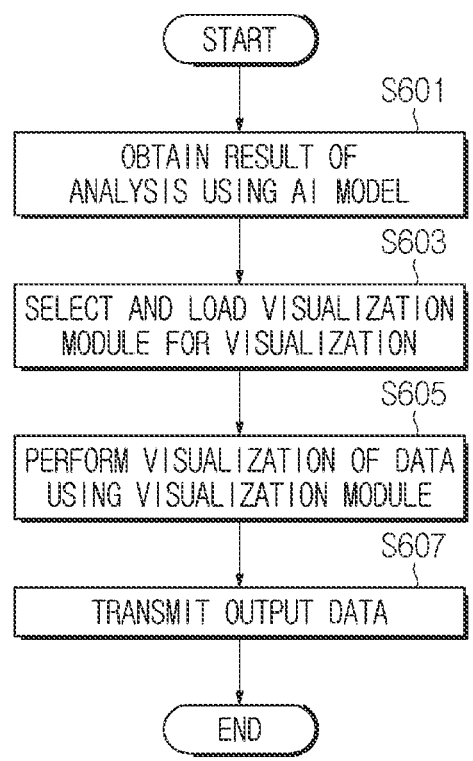
FIG. 6 illustrates an example of a procedure for generating output data in a pharmacovigilance platform according to an embodiment of the prevent disclosure.

FIG. 6 illustrates an example of a procedure for generating output data in a pharmacovigilance platform according to an embodiment of the prevent disclosure. FIG. 6 exemplifies a method for operating a server (e.g., server 120).

Referring to FIG. 6, at step S601, a server obtains an analysis result using an artificial intelligence model. That is, the server obtains a result of a task that is performed using the artificial intelligence model. Herein, an inference operation using the artificial intelligence model may be performed by the server or by another device.

At step S603, the server selects and loads a visualization module for visualization. Herein, the visualization module may be selected based on a hardware capacity of a user device, a request from a user and the like. When necessary, two or more visualization modules may be selected. At least one visualization module thus selected is loaded from a corresponding repository (e.g., the visualization module repository 330b) into a memory.

At step S605, the server performs visualization of data by using the visualization module. That is, the server determines output data for visually expressing a result of inference that is obtained by using the artificial intelligence model. Visual expression of an inference result may be generated by using a text, a graphic and an image. Herein, the output data may be generated in consideration of the hardware capacity of a user device that will use the output data.

At step S607, the server transmits the output data. The output data is transmitted to the user device that requests an analysis result. In addition, the output data may be transmitted to another relevant user device apart from the user device that requests the analysis result. Herein, the output data may include information that is differentiated according to an authority level of a user device.

According to the embodiment described with reference to FIG. 6, various forms of visualized information may be provided to a user. According to a suitable design of a visualization module, overall management and monitoring of adverse effects of medicines become possible, and furthermore, a platform according to an embodiment of the present disclosure may provide an interface that makes risk monitoring and tracking easy.

For example, by inputting minimum information (e.g., a medicine name and a name of an adverse event) at a book-in step, an invalid case may also be cumulatively managed. For a medicine regarding which a post-marketing risk management plan (RMP) should be submitted, the platform may monitor whether or not an adverse event with preset risk is detected, and inform relevant PV personnels of an action to be taken. In addition, the platform may set a submission date of a regular safety report and a lock point of data and integrate and analyze accumulated data in time.

According to the embodiment described with reference to FIG. 6, various forms of visualized information may be provided to a user. Herein, a visualization function thus provided may be different according to an authority level of the user. For example, when a data input task is performed, a form capable of testing whether or not an input result is right may be supported for a user with the authority level of QC. According to an embodiment, output data may include input data (e.g., an email and an image), a result of a task (e.g., a result with information input in a standard form), and information on matching between an item included in the input data and an item included in the result of the task. In this case, in the user device, both the input data and the result of the task are displayed, and the user may compare them accordingly. Furthermore, for convenience of comparison and determination, the user device may display a first indicator (e.g., a color box in a same color) indicating a matching relationship between identical items and a second indicator (e.g., a color box in a vacant input box of a task result) indicating an item that is included in input data but is not input into the task result, together with the input data and the task result.

Figure 7:
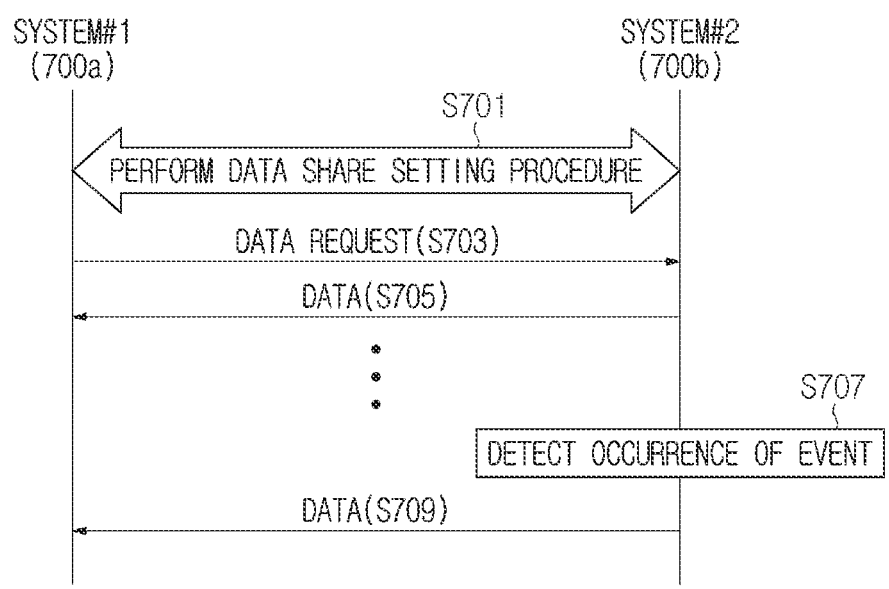
FIG. 7 illustrates an example of a procedure for sharing data between systems in a pharmacovigilance platform according to an embodiment of the present disclosure.

FIG. 7 illustrates an example of a procedure for sharing data between systems in a pharmacovigilance platform according to an embodiment of the present disclosure. FIG. 7 exemplifies signal exchange for data sharing between different systems 700a and 700b. Herein, the system #1 700a and the system #2 700b are systems that are used by different subjects (e.g., companies). In FIG. 7, operation subjects are described as the system #1 700a and the system #2 700b but may be understood as intermediate devices designed for information exchange between servers of each system or between systems.

Referring to FIG. 7, at step S701, the system #1 700a and the system #2 700b perform a setting procedure for data sharing. For data sharing, the system #1 700a and the system #2 700b may transmit and receive at least one message between each other. For example, the at least one message may include a share request message and a share response message. Sharing is either bilateral sharing or unilateral sharing, and a system, which provides data, may register information on a counterpart system in an internal database. In the case of FIG. 7, a sharing setting of providing data from the system #2 770b to the system #1 770a is performed.

At step S703, the system #1 770a transmits a data request message to the system #2 770b. The data request message may be periodically transmitted or be transmitted when a set condition is satisfied.

At step S705, the system #2 770b transmits data to the system #1 770a. That is, the system #2 770b transmits data as a response to the request of the system #1 770a. Herein, the system #2 770b may transmit the data after checking whether or not it has an access authority to the data requested by the system #1 770a. If the approval of a user having a specific authority level for data sharing is needed, the system #2 770b may transmit the data after confirming the approval of the user.

At step S707, the system #2 770b detects occurrence of an event for data sharing. Herein, the event may be defined in various ways. For example, the event may be defined based on at least one of modification of data to be shared, a last sharing point, and a data-related security level. When the data is shared by the occurrence of an event, no request from the system #1 770a is needed.

At step S709, the system #2 770b transmits data to the system #1 770a. If the approval of a user having a specific authority level for data sharing is needed, the system #2 770b may transmit the data after confirming the approval of the user.

Through the embodiment described with reference to FIG. 7, data may be shared between different systems. A function of data sharing, which is provided by a pharmacovigilance platform according to an embodiment of the present disclosure, enables, among various tasks belonging to a pharmacovigilance procedure, not only report to a regulative authority but also support for organic practice (e.g., sharing of adverse effects, data unification task, etc) with a partner company for maintaining the overall pharmacovigilance system. That is, the platform according to an embodiment of the present disclosure may function as a safety control tower, and particularly, may support data exchange by forming a network between databases and, for a multinational clinical test on a global scale or for an item in which many partner companies are involved, enable information from the whole world to be grasped immediately from a database. In this regard, the pharmacovigilance platform may support further functions like data exchange scheduling and job assignment to a person in charge.

According to an embodiment, based on features of a database and a network, a plurality of systems may be operated like a single system for a specific item. That is, systems of companies, which are in partnership with each other, may be used as a single team. Specifically, functions, which can be set in one system, may be implemented by aligning functions of a plurality of connected systems.

According to a concrete embodiment, systems of different companies may share a CE phase, a QC phase, a MR phase and a CL phase. For example, after the system #1 of a partner company of a country A collects a case in the country A and performs a book-in phase and the CE phase, the system #1 may transmit the case to the system #2 of a country B, which functions as a control tower. Then, the system #2 may transmit a result to the system #1 after performing the QC phase, the MR phase and the CL phase. That is, the system #2 may give a regulative authority report case on a submission page of the system #1.

According to a concrete embodiment, three or more systems may perform division. For example, when a headquarter in a country A, which is a control tower, is a structure to which a PV activity of a branch of a country B is entrusted, if there are a system #1 of the company headquarter established in the country A, a system #2 of a branch established in the country B, and a system #3 of a partner company established in the country B, the system #3 may collect a case, perform a book-in phase and a CE phase and then transmit the case to the system #2. Next, the system #2 may transmit a result to the system #1 after performing a QC phase and an MR phase. When the system #1 performs a CL phase and generates a final report and then transmits it to the system #2, the system #2 may transmit the final report to a system of a regulative authority. A similar procedure may be implemented with a system of a branch established in another country.

A procedure, which is implemented by aligning functions of a plurality of systems, as described above, may be implemented in an environment which secures the similarity of performance or feature in artificial intelligence models of the plurality of systems. For this, the plurality of systems operating with each other may be managed to have similar performance and a compatible feature through learning data sharing, transfer learning, and synchronization of artificial neural network structures.

According to an embodiment, data exchange scheduling, job assignment to a person in charge, management of report to a regulative authority, management of a transaction continuity plan (BCP), which is operated due to national holidays/vacations/disasters, may be timely implemented, and the quality of pharmacovigilance may be enhanced accordingly. Herein, for the BCP management, a platform may determine an expected time of job disruption of each user based on a vacation plan of each user, national holidays identified in calendar information and disaster information input by a manager, and determine and make a connection to another user (hereinafter 'backup user') capable of backing up the job. In order to select a backup user, the platform may generate a condition for backing up a user who will undergo the disruption of job, search for a backup user satisfying the generated condition, and transmit a request message to the backup user thus searched. In addition, the platform may provide information on the searched backup user to users associated with the job of the user who will undergo the disruption.

When the backup user performs a backup task, the platform temporarily gives the backup user an authority necessary for backup. For temporary authorization, the platform sets a secondary authority independent of an existing one and sets a time limit on the secondary authority. Herein, not only the user's authority, but also reading, downloading and access authority to generated data may have a time limit during the backup task. That is, even if the backup user generates data, when an authorization period expires, the backup user cannot access the data.

Although the exemplary methods of the present disclosure are represented by a series of acts for clarity of explanation, they are not intended to limit the order in which the steps are performed, and if necessary, each step may be performed simultaneously or in a different order. In order to implement a method according to the present disclosure, the illustrative steps may include an additional step or exclude some steps while including the remaining steps. Alternatively, some steps may be excluded while additional steps are included.

The various embodiments of the present disclosure are not intended to be all-inclusive and are intended to illustrate representative aspects of the disclosure, and the features described in the various embodiments may be applied independently or in a combination of two or more.

In addition, the various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

What is claimed is:

1. A method for operating a server that provides a pharmacovigilance (PV) platform, the method comprising:
    receiving input data comprising information related to a task from a user device;
    selecting and loading a first artificial intelligence model to process the input data among a plurality of artificial intelligence models stored in a first repository;
    generating, based on the input data, at least one command set usable in the PV platform by using the first artificial intelligence model configured to perform optical character recognition (OCR) and natural language processing (NLP);
    determining whether or not a user providing the input data has authority to execute the task indicated by at least one command set;
    determining whether processing by a previous user on a processing path is completed, when the user has the authority, wherein the processing path defines an order of a plurality of users for sequential processing of the task;
    based on the processing of the previous user being completed, selecting and loading a second artificial intelligence model among the plurality of artificial intelligence models stored in the first repository, wherein the second artificial intelligence model is selected based on an authority level of the user and the task;
    generating a result of performing the task according to the at least one command set by using the second artificial intelligence model configured to perform at least one task corresponding to the authority level of the user among a plurality of tasks including case entry (CE), quality control (QC), medical review (MR), and case lock (CL);
    selecting and loading a visualization module to visualize the result of the task among a plurality of visualization modules stored in a second repository, based on hardware information of the user device and a device of a subsequent user on the processing path;
    generating output data displaying the result of the task by using the visualization module; and
    transmitting the output data to the user device and the device of the subsequent user.

2. The method of claim 1, further comprising:
    determining an urgency of the task based on at least one keyword in the input data using the first artificial intelligence model;
    based on the urgency of the task, selecting one user of the plurality of users based on a past history of task performance;
    transmitting a request message inquiring whether the one user can immediately perform the task to the device of the one user; and
    determining the one user as the subsequent user based on receiving a response message to the request message.

3. The method of claim 1, wherein the visualization module is selected based on the user, hardware capacity of the user device, and the task among a plurality of visualization modules stored in the visualization module repository.

4. The method of claim 1, wherein the input data has at least one form of an image document, an email, a user input, or an electronic document, and
    wherein the first artificial intelligence model performs, for the input data, the OCR and the NLP.

5. The method of claim 1, further comprising:
    determining an urgency of the task based on at least one keyword in the input data using the first artificial intelligence model; and
    based on the urgency of the task being greater than a threshold level, simplifying a plurality of tasks that are performed sequentially related to the task.

6. The method of claim 5, wherein the simplifying of the plurality of tasks comprises merging at least two tasks of the plurality of tasks, or omitting at least one task of the plurality of tasks, and
    wherein the CE is a task of converting, based on an input format, data regarding an adverse event cases received from the first artificial intelligence model, the QC is a task of performing quality control on the converted data, the MR is a task of performing causality assessment of the adverse event cases, and the CL is a task of performing final approval of the adverse event cases.

7. The method of claim 1, further comprising:
    receiving a review result of the user concerning the result of the task; and
    analyzing and storing the review result by using a third artificial intelligence model.

8. The method of claim 1, wherein:
    the previous user comprises a user for a first task that is performed before the task among a plurality of tasks related to the task; and
    wherein the subsequent user comprises a user for a second task that is performed after the task among the plurality of tasks related to the task.

9. The method of claim 1, wherein the generating of the result of the task comprises converting clinical information, which includes an adverse event, a patient history and an underlying disease that are included in the input data, and item information into structured data through artificial intelligence model learning, and
    wherein the second artificial intelligence model is retrained based on the user feedback indicating disagreement with the result of performing the task.

10. The method of claim 9, wherein the output data includes the input data, the result of the task and information associated with matching between an item included in the input data and an item included in the result of the task, and wherein:
    the input data and the result of the task are displayed on the user device, together with a first indicator indicating a matching relation between identical items and a second indicator indicating an item that is included in the input data but is not input into the result of the task.

11. The method of claim 1, further comprising:
    omitting at least one task among a plurality of tasks that are performed sequentially and associated with the task, based on a degree of an adverse effect indicated by an adverse case included in the input data.

12. The method of claim 1, further comprising:
    controlling to perform additional tasks in addition to a plurality of tasks that are performed sequentially and associated with the task, based on a degree of an adverse effect indicated by an adverse case included in the input data.

13. A system for providing a pharmacovigilance (PV) platform, the system comprising:
    a receiver configured to receive input data comprising information related to a task from a user device;

an input processing unit configured to:
select and load a first artificial intelligence model to process the input data among a plurality of artificial intelligence models stored in a first repository;
generate, based on the input data, at least one command set usable in the PV platform by using the first artificial intelligence model configured to perform optical character recognition (OCR) and natural language processing (NLP);
an authority check module configured to determine whether or not a user providing the input data has authority to execute the task indicated by at least one command set;
an artificial intelligence analysis module configured to:
determine whether processing by a previous user on a processing path is completed, when the user has the authority, wherein the processing path defines an order of a plurality of users for sequential processing of the task;
based on the processing of the previous user being completed, select and load a second artificial intelligence model among the plurality of artificial intelligence models stored in the first repository, wherein the second artificial intelligence model is selected based on an authority level of the user and the task; and
generate a result of performing the task according to the at least one command set by using the second artificial intelligence model configured to perform at least one task corresponding to the authority level of the user among a plurality of tasks including case entry (CE), quality control (QC), medical review (MR), and case lock (CL);
a visualization module configured to select and load a visualization module to visualize the result of the task among a plurality of visualization modules stored in a second repository, based on hardware information of the user device and a device of a subsequent user on the processing path and generate output data that displays the result of the task by using the visualization module; and
a transmitter configured to transmit the output data to the user device and the device of the subsequent user.

14. The system of claim 13, wherein the input processing unit is further configured to:
determine an urgency of the task based on at least one keyword in the input data using the first artificial intelligence model;
based on the urgency of the task, select one user of the plurality of users based on a past history of task performance;
transmit a request message inquiring whether the one user can immediately perform the task to the device of the one user; and
determine the one user as the subsequent user based on receiving a response message to the request message.

15. The system of claim 13, wherein the visualization module is selected based on the user, hardware capacity of the user device, and the task among a plurality of visualization modules stored in the visualization module repository.

16. The system of claim 13, wherein the input data has at least one form of an image document, an email, a user input, or an electronic document, and wherein:
the first artificial intelligence model performs, for the input data, the OCR and the NLP.

17. The system of claim 13, wherein the input processing unit is further configured to:
determine an urgency of the task based on the input data using the first artificial intelligence model; and
based on the urgency of the task being greater than a threshold level, simplifying the plurality of tasks that are performed sequentially related to the task,
wherein at least two tasks of the plurality of tasks are merged or at least one task of the plurality of tasks is omitted, and
wherein the CE is a task of converting, based on an input format, data regarding an adverse event cases received from the first artificial intelligence model, the QC is a task of performing quality control on the converted data, the MR is a task of performing causality assessment of the adverse event cases, and the CL is a task of performing final approval of adverse event cases.

18. The system of claim 13, wherein the receiver is further configured to receive a review result of the user concerning the result of the task, and wherein:
the artificial intelligence analysis module is further configured to analyze and store the review result by using a third artificial intelligence model.

19. The system of claim 13, wherein the artificial intelligence analysis module is further configured to convert clinical information, which includes an adverse event, a patient history and an underlying disease that are included in the input data, and item information into structured data through artificial intelligence model learning, and
wherein the second artificial intelligence model is retrained based on user feedback indicating disagreement with the result of the performing the task.

20. The system of claim 13, wherein the artificial intelligence analysis module is further configured to apply exception handling to a series of procedures associated with the task, according to a degree of an adverse effect in which an adverse event included in the input data appears.

* * * * *